W. B. Kidder,
Plow Fender.
No. 106,064. Patented Aug. 2, 1870.
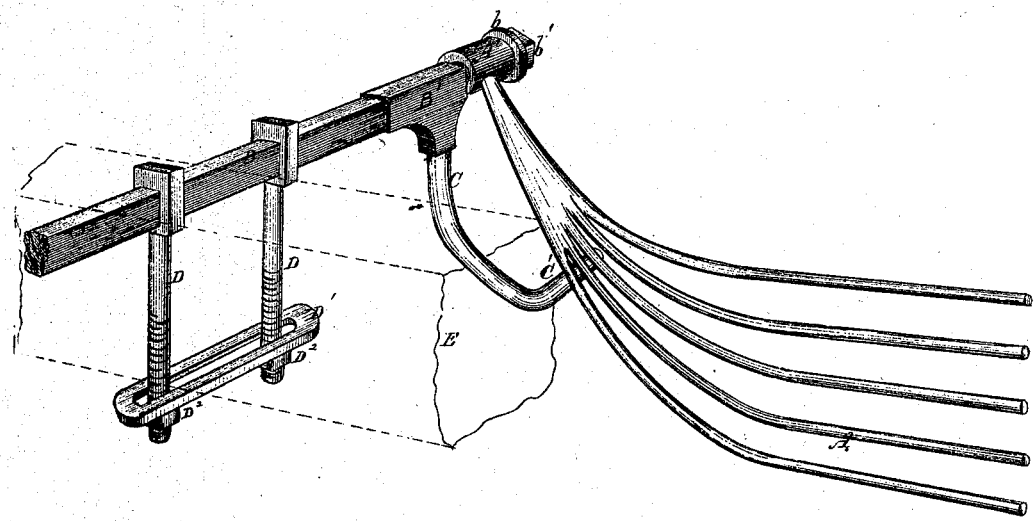
Witnesses
W. B. Kidder
Inventor

UNITED STATES PATENT OFFICE.

WILLIAM B. KIDDER, OF PIKE TOWNSHIP, JAY COUNTY, INDIANA.

IMPROVEMENT IN CLOD-FENDERS FOR PLOWS.

Specification forming part of Letters Patent No. 106,064, dated August 2, 1870.

*To all whom it may concern:*

Be it known that I, WILLIAM B. KIDDER, of Pike township, in the county of Jay and State of Indiana, have invented certain Improvements in Clod-Fenders for Plows; and I do hereby declare that the following is a full, clear, and exact description thereof, reference being had to the annexed drawing, making part of this specification, in which the figure represents a perspective view of the fender and parts by which it is secured to a plow-beam.

This invention relates to an attachment for plows and cultivators called a "clod-fender," serving, as the name intends to indicate, to protect the young crops, while cultivating among them, from heavy clods of earth falling upon them as such clods are turned up by the blade.

My improvement consists in the combination and arrangement of the various parts of which the device is composed, as will be more fully set forth hereinafter.

To enable those skilled in the art to make and use my invention, I will proceed to describe its construction and operation.

In the annexed drawing, A represents the screen or fender proper, consisting of a number of horizontal and for some distance parallel rods, all united at their forward ends in a single stout bar which terminates in a transverse tubular collar or sleeve, A'. The lowest rod of the fender is gradually curved upward from its horizontal portion, so as to enable it to surmount obstructions or unevenness of the ground with great ease, the other rods being similarly curved, as clearly shown.

B is a square bar of metal, of any desired length, terminating at one end in a round stud or wrist, with a screw-thread upon its outer portion. Upon this wrist the fender or screen A is pivoted by means of its sleeve, after which a washer, $b$, may be slipped on, and then a nut, $b'$, screwed upon the projecting end to hold such fender in place, permitting it, however, to swing freely on the wrist. At B', beginning at its wrist, the bar B is somewhat enlarged, and has an arm, C, swaged or otherwise secured to it, which, extending first downward for some distance, is then turned outward laterally to form a stop or support, C', against which the curved forward end of the screen rests.

The bar B and the screen or fender pivoted to it are secured to the beam E of a plow or cultivator by means of eyebolts D D, slotted strap D', and nuts $D^2$ $D^2$, all together forming an adjustable clip, the slotted strap making it adaptable to beams of different sizes.

By pushing the square bar out or in the fender may be set at any desired distance from the beam, and it can of course be attached at any point thereon by the clip. I have in the drawing the bar on top of the beam; but its position may be changed if the height of the beam makes it desirable, and it placed under such beams.

The principal merits of this clod-fender consist in its simplicity of construction and that its screen is not liable to get clogged. Its rear end, being left entirely unobstructed by cross-bars, permits weeds and clods to pass off from it readily. This clearing is also aided by the jolting motion of the screen as it passes over the uneven ground.

What I claim as my invention, and desire to secure by Letters Patent, is—

A clod-fender combining in its construction an adjustable bar, B, arm C C' thereon, and a screen, A, pivoted to such bar, substantially as set forth.

In testimony whereof I have signed my name to this specification in the presence of two subscribing witnesses.

WILLIAM B. KIDDER.

Witnesses:
SAMUEL BROWN,
CHARLES F. HEADINGTON.